Aug. 19, 1958   P. E. WOODRUFF   2,847,969
FLUID FLOW INDICATOR
Filed July 11, 1956

INVENTOR
Paul E Woodruff

United States Patent Office

2,847,969
Patented Aug. 19, 1958

2,847,969

FLUID FLOW INDICATOR

Paul E. Woodruff, Columbus, Ohio, assignor to Walter S. Roboski, Columbus, Ohio

Application July 11, 1956, Serial No. 597,205

8 Claims. (Cl. 116—117)

This invention relates to an improved fluid flow indicator adapted for interposition in pipe lines employed in confining flowing fluids, either gaseous or liquid, the indicator having an exteriorly viewable colored element confined for flow-indicating movement in a casing therefor when fluid passage, transmitted thereto by associated pipe lines, takes place therethrough.

In prior devices of this kind, as shown, for example, in the patent of A. L. Grise et al., No. 2,678,624, granted May 18, 1954, difficulty is often encountered in the matter of obtaining free movement on the part of the exteriorly viewable and movable indicating element because of the tendency of the element to migrate under unidirectional fluid flow toward a fixed position adjacent to a fluid outlet port leading from the enclosed chamber of the indicator casing in which the element is arranged. Again, in such prior devices solids, if present in the fluids being handled, collect in the chamber and deposit on the inner surfaces of a dome-shaped transparent cover section of the indicator casing in obscuring vision therethrough, such deposits, also, offering an obstruction to free fluid flow through the indicator. Also, such prior devices are usually required to be placed in a single position to permit of their normal operation, thereby frequently complicating the pipe system in which they are installed.

The objects of the present invention, therefore, are to provide a visual fluid flow indicator which is so formed that the casing confined, exteriorly viewable, flow-indicating element or elements thereof will be maintained in a constant state of motion whenever fluid flow takes place through the indicator; to provide an indicator which will operate to indicate fluid flow therethrough in any operating position in which it may be placed in a fluid flow system; to provide an indicator of the character indicated in which the accumulations of flow obstructing and cover section clouding solids or other deposits in the indicator element chamber is precluded; to provide an indicator of this type in which the fluid enters and leaves the element chamber through a plurality of grouped ports; to provide in a preferred form of my invention an indicator element having a lightweight, buoyant body formed with a plurality of relatively spaced outwardly projecting, angularly set blades or vanes so formed and arranged to be sensitively responsive to fluid flow through the element-containing chamber of the appliance to impart flow-indicating movement to the element; and to provide an indicator which is an improvement generally in appliances of the kind set forth.

With these and other ends in view which will readily appear as the nature of the invention is better understood, the same consists in the improved construction and novel arrangement and combination of parts which will be hereinafter fully described and particularly pointed out in the appended claims.

In the accompanying drawing there has been illustrated certain preferred forms of the present invention, it being, however, understood that no limitation is necessarily made to the precise structural details therein exhibited, but that changes, alterations and modifications within the scope of the claims may be resorted to when desired.

In the drawing.

Corresponding parts in the several figures are denoted by like characters of reference.

Figure 1:
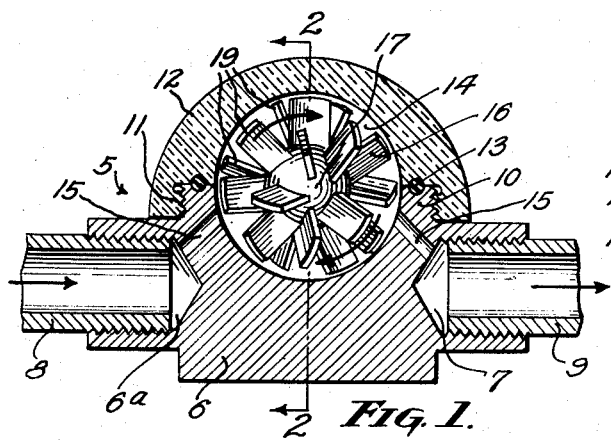
Fig. 1 is a vertical, longitudinal sectional view taken through the visual fluid flow indicator of the present invention and illustrating a bladed indicator element arranged in the viewable flow chamber thereof.
Figure 2:
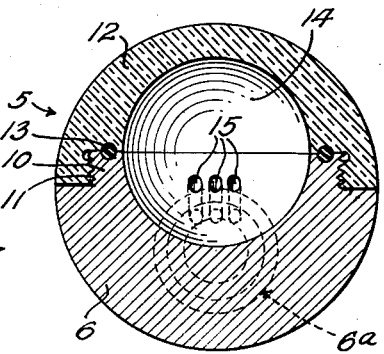
Fig. 2 is a transverse vertical sectional view taken through the indicator on the plane disclosed by the line 2—2 of Fig. 1 but with the indicating element removed, in order to show one set of the fluid inlet or outlet ports of the flow chamber.

As shown in the drawing, the casing 5 of my improved fluid-flow indicator is formed to comprise a base section 6 preferably of metal. The casing on one side thereof is formed with an internally threaded, fluid inlet opening 6a and on its opposite side with a corresponding fluid outlet opening 7, which is aligned longitudinally wtih the inlet opening. It will be understood that while these openings have been termed "inlet" and "outlet," this has been done to facilitate description of the apparatus, as the construction admits of the flow of fluid in either direction therethrough. Received in these openings are pipe members 8 and 9 which form a part of an associated fluid flow system.

The base section 6 is formed with an integral, annular flange 10 which is externally threaded to receive the internal threads formed on the wall of a socket 11 provided in the open end of a separable, dome-shaped cover section 12, the latter being composed of a transparent material, such as one of the synthetic resins, or glass, the former material being preferable. An O-type gasket ring 13 is positioned in registering grooves formed in the complemental meeting faces of the casing section to seal and prevent fluid leakage through the interface formed thereby.

Each of the sections is formed with a semispherical chamber so that when the sections are united, as shown, a truly spherical chamber 14 is provided within the casing. The chamber 14 communicates with the inner ends of the openings 6a and 7 by means of angularly disposed, inwardly converging, groups of spaced ports 15, the ports of each group being disposed in parallel order. It is important in maintaining unobstructed fluid flow through the casing, and positive rotation of an indicating element hereinafter described, that each group be composed of a plurality of the ports, preferably three as here shown.

Disposed within the chamber is a movable indicating element 16, which in its preferred form, comprises a buoyant, lightweight body, also, preferably composed of distinctively colored plastic material. The spherical body 17 of the element in this instance is provided with a plurality of sockets in which are received and secured the reduced stems 18 of a plurality of relatively spaced, angularly disposed, vanes or blades 19 which impart rotation to the indicating element whenever there is fluid flow at all through the casing. The multiple ports of restricted diameter direct jets of fluid against these vanes or blades in a manner producing positive rotation thereof, and as a result of such rotation of the brightly colored element, the same is viewable clearly through the transparent wall of the cover section from an exterior point of view.

The indicator element has a diameter, as measured across its blade tips, slightly less than the diameter of the chamber 14, so that as the element rotates it has wiping or rubbing contact with the spehrical wall surfaces of the chamber, thus keeping the wall surfaces free from films or deposits of solids entrained in the flowing fluids, thus enabling the indicator element to be clearly viewable at all times in the use of the appliance, as well as positively removing such solids from the chamber. Furthermore, the construction of the appliance is such that it does not require placement in a given single position in a pipe line, but will function with equal effectiveness in any location in such a line, whether upright as shown, inverted, or placed sideways. These advantages over prior devices of this kind result from the use of the multiple ports and the construction of the flow-indicating element.

Figure 3:
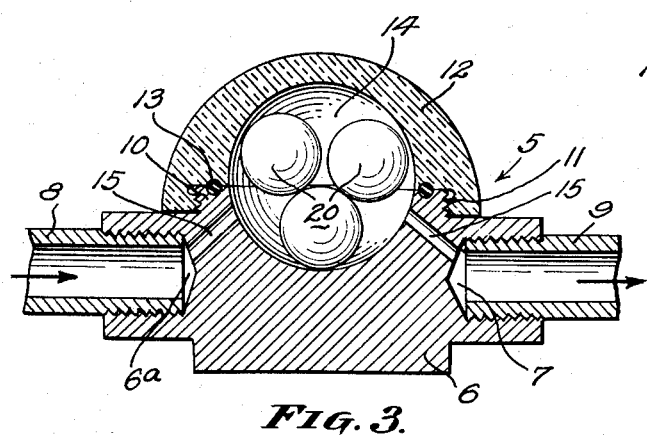
Fig. 3 is a sectional view corresponding to Fig. 1 but illustrating the flow chamber as containing a plurality of smooth-surfaced, spherical, indicating elements.
Figure 4:
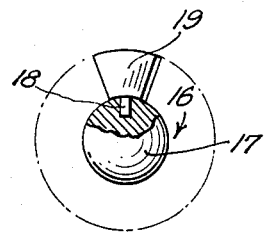
Fig. 4 is a detail view, partially in front elevation and vertical section, showing the manner of mounting the blades of the indicating element of Fig. 1 on the body of the element.

In the modified but less desirable form of my invention illustrated in Fig. 3, the flow-indicating means comprises a plurality of distinctively colored, lightweight and buoyant ball elements 20. The total effective diameter of these elements is such that as the same respond to the motivating fluid jets issuing from the multiple fluid inlet ports 15 the same rub or wipe against each other and against the spherical wall surface of the chamber 14, maintaining said surface clean and clear and devoid of film or solid accumulations, and likewise the colored surfaces of the elements themselves. With the use of a plurality of the elements 20 and the plurality of fluid inlet ports positive circulating motion in the chamber 14 is imparted at all times to said elements whenever fluid flow at any rate through the chamber exists, thereby overcoming one of the chief objections found in prior devices wherein but a single ball element and a single inlet port are used, since in such construction the element tends to maintain itself under fluid flow in a stationary position adjacent the single fluid outlet port of the chamber, and to thereby interfere with fluid flow after the manner of a ball check valve. In my present construction, such a static condition of the indicating element or elements cannot take place because of the presence of the multiple ports which keep the elements in sustained motion around the chamber whenever fluid flow, even to a very negligible degree, takes place through the casing.

I claim:

1. A fluid flow indicator comprising: a casing composed of separably united base and cover sections which when in assembled relationship define an internal spherical chamber, said base section being formed with spaced fluid inlet and outlet openings for connection with associated pipe members of a pipe line through which fluid flow prevails, said inlet and outlet openings each communicating with a plurality of spaced ports leading from said openings to said chamber, the cover section possessing transparency, and a buoyant flow indicator disposed in said chamber responsive to the passage of fluid therethrough to revolve about the spherical wall of said chamber, whereby to disclose through visual observation the presence of fluid flow in said pipe line.

2. A visual fluid flow indicating appliance for interposition of a fluid flow system, said device comprising a casing formed internally with a spherical chamber, said casing being formed on one side thereof with a fluid inlet opening and on its opposite side with a fluid outlet opening, said openings being joined with associated pipe members of the fluid system, each of said openings communicating at the inner ends thereof with a plurality of spaced grouped ports leading to said chamber, said chamber being formed to include a transparent outer wall, and an indicating element disposed in said chamber, said element being responsive to the passage of fluid through the chamber to circulate around its spherical wall surface in response to multiple fluid streams entering the chamber through said ports, whereby to disclose by visual observation through said transparent wall the presence of fluid flow in said system.

3. A fluid flow indicating appliance as defined in claim 2, and wherein an indicating element is disposed in the chamber, said element being substantially spherical and having in its motion rubbing contact with the wall surface of the chamber, said element being formed with a plurality of radiating, circumferentially disposed, relative spaced blades.

4. A fluid flow indicating appliance as defined in claim 2, and wherein said indicating element is formed to provide a buoyant lightweight body formed outwardly thereof with a multiplicity of relatively spaced, angularly disposed blades to render its movement sensitively responsive to fluid flow through said chamber.

5. A fluid flow indicating appliance as defined in claim 2, and wherein the ports of each group are disposed in parallel order with the groups converging relatively angularly from said openings toward said chamber.

6. An indicating element for visual fluid flow appliances, said element comprising a lightweight, buoyant body formed outwardly thereof with a multiplicity of relatively spaced and angularly disposed propelling blades.

7. An indicating element for visual fluid flow appliances, said element comprising a lightweight, buoyant body formed outwardly thereof with a multiplicity of relatively spaced and angularly disposed propelling blades, said blades bearing a variegated coloration.

8. A visual fluid flow indicating appliance comprising: a casing composed of a base section and a substantially transparent cover section; means uniting said sections in fluid sealing, assembled relation, each of said sections being formed with a semispherical chamber which, when the sections are united, register relatively to form within the casing a composite spherical chamber; said base section on one side thereof being formed with a fluid inlet opening and on its opposite side with a longitudinally aligned outlet opening, said openings being formed for the reception of associated pipe members of a fluid flow system, said openings terminating inwardly in restricted ports leading to and in open communication with said spherical chamber; and a buoyant, colored, flow-indicating element mounted in said chamber for movement therein in response to fluid flow therethrough, said element including a lightweight body formed on its outer surface with a multiplicity of relatively spaced, outwardly projecting and angularly disposed propelling blades, said blades serving to render said element sensitively responsive to fluid flow through said chamber in causing the element to revolve.

References Cited in the file of this patent

UNITED STATES PATENTS

| 1,355,165 | Rasch | Oct. 12, 1920 |
| 2,678,624 | Grise | May 18, 1954 |
| 2,691,955 | Pacey | Oct. 19, 1954 |
| 2,747,403 | Stevenson | May 29, 1956 |